United States Patent
Seo et al.

(10) Patent No.: US 12,542,885 B2
(45) Date of Patent: Feb. 3, 2026

(54) LIGHT MEASURING DEVICE

(71) Applicant: SAMSUNG DISPLAY CO., LTD., Yongin-si (KR)

(72) Inventors: Jin Seo, Yongin-si (KR); O Jun Kwon, Yongin-si (KR); Jae Joong Kwon, Yongin-si (KR); Young Min Park, Yongin-si (KR); A Ree Song, Yongin-si (KR); Eun Jung Lee, Yongin-si (KR); Ha Young Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 156 days.

(21) Appl. No.: 18/602,399

(22) Filed: Mar. 12, 2024

(65) Prior Publication Data
US 2024/0397026 A1   Nov. 28, 2024

(30) Foreign Application Priority Data

May 30, 2023   (KR) .................. 10-2023-0069506

(51) Int. Cl.
  *H04N 13/167*   (2018.01)
  *G02F 1/167*   (2019.01)
  *H04N 13/344*   (2018.01)

(52) U.S. Cl.
  CPC ........... *H04N 13/167* (2018.05); *G02F 1/167* (2013.01); *H04N 13/344* (2018.05)

(58) Field of Classification Search
  CPC .... H04N 13/167; H04N 13/344; G02F 1/167; G02B 27/0093; G02B 5/223; G02B 13/0035; G02B 2003/0093; G01M 11/0207; G01M 11/04
  See application file for complete search history.

(56) References Cited

U.S. PATENT DOCUMENTS 5,124,835 A  *  6/1992  Shibaguchi .......... H04N 1/0402
                                                                359/319
10,855,892 B2   12/2020  Chao
(Continued)

FOREIGN PATENT DOCUMENTS

KR        10-2512629 B1      3/2023

OTHER PUBLICATIONS

Xi Mou et al., "A Novel Method for Measuring Optical Performance of AR/VR Displays", SID2017, Symp. Dig 87, 1579-1580, Jun. 2017.
(Continued)

*Primary Examiner* — Alazar Tilahun
(74) *Attorney, Agent, or Firm* — F. CHAU & ASSOCIATES, LLC

(57) ABSTRACT

A light measuring device includes: a first lens; a first variable opening located in a first direction from the first lens at a predetermined distance; a second lens located in the first direction from the first variable opening at a predetermined distance; a second variable opening located in the first direction from the second lens; a third lens located in the first direction from the second variable opening; and a light receiving unit located in the first direction from the third lens at a predetermined distance, wherein a diameter of the first variable opening and a diameter of the second variable opening are independently adjusted.

20 Claims, 9 Drawing Sheets

(56) References Cited

U.S. PATENT DOCUMENTS 11,307,374 B2\* 4/2022 Koyama ............... H04N 23/60
2002/0008208 A1\* 1/2002 Muto ................ H01J 37/3056
250/423 R

OTHER PUBLICATIONS

Kosei Oshima et al., "Eyewear Display Measurement Method: Entrance Pupil Size Dependence in Measurement Equipment", SID2016, Symp, Dig 47(1), 1064-1067, May 2016.

\* cited by examiner

LIGHT MEASURING DEVICE

CROSS-REFERENCE TO RELATED APPLICATION

The application claims priority under 35 U.S.C. § 119(a) to Korean Patent Application No. 10-2023-0069506, filed on May 30, 2023, the disclosure of which is incorporated by reference herein in its entirety.

TECHNICAL FIELD

The present invention relates to a light measuring device.

DISCUSSION OF THE RELATED ART

As information technology continues to further develop, the importance of a display device as a connection medium between a user and information continues to increase. In response to this, the use of display devices such as a liquid crystal display device and an organic light emitting display device is increasing.

Recently, a near eye display device for realizing AR (Augmented Reality) or VR (Virtual Reality) is under development. A light measuring device may be desirable to check whether the near eye display device accurately displays an image to a human eye.

However, in a case of the near eye display device, since a distance between a display device and the eye may be very small and a structure of the human eye (e.g., size and location of the iris, pupil, retina, etc.) should be considered, it might not be accurate to evaluate light characteristics using a conventional light measuring device.

SUMMARY

According to an embodiment of the present invention, a light measuring device includes: a first lens; a first variable opening located in a first direction from the first lens at a predetermined distance; a second lens located in the first direction from the first variable opening at a predetermined distance; a second variable opening located in the first direction from the second lens; a third lens located in the first direction from the second variable opening; and a light receiving unit located in the first direction from the third lens at a predetermined distance, wherein a diameter of the first variable opening and a diameter of the second variable opening are independently adjusted.

In an embodiment of the present invention, the first lens includes a convex surface protruding in the first direction.

In an embodiment of the present invention, the second lens includes a convex surface protruding in a direction opposite to the first direction.

In an embodiment of the present invention, the third lens includes a convex surface protruding in the first direction.

In an embodiment of the present invention, the second variable opening includes a plurality of partial openings arranged in a second direction that is different from the first direction.

In an embodiment of the present invention, n partial openings among the plurality of partial openings are in an open state when the second variable opening has a first diameter, and m partial openings among the plurality of partial openings are in an open state when the second variable opening has a second diameter, wherein n and m are integers greater than 0, and wherein m is greater than n when the second diameter is greater than the first diameter.

In an embodiment of the present invention, each of the plurality of partial openings includes: a transparent layer; a plurality of electronic ink capsules positioned inside the transparent layer; and a first electrode.

In an embodiment of the present invention, in each of the plurality of partial openings, the first electrode is located on an upper surface of the transparent layer.

In an embodiment of the present invention, each of the plurality of partial openings further includes: a second electrode that is insulated from the first electrode.

In an embodiment of the present invention, the second electrode is located on a side surface of the transparent layer.

In an embodiment of the present invention, the second electrode is located on a lower surface of the transparent layer.

In an embodiment of the present invention, each of the plurality of partial openings further includes: a third electrode located on a side surface of the transparent layer.

In an embodiment of the present invention, each of the plurality of partial openings is in an open state when a voltage is applied to the first electrode.

In an embodiment of the present invention, each of the plurality of partial openings is in a blocked state when the voltage is not applied to the first electrode.

In an embodiment of the present invention, each of the plurality of partial openings is in an open state when a voltage is applied to the first electrode.

In an embodiment of the present invention, each of the plurality of partial openings is in a blocked state when a voltage is applied to the second electrode.

In an embodiment of the present invention, a distance between the first lens and the second lens is larger than a distance between the second lens and the third lens.

In an embodiment of the present invention, the first lens further includes a flat surface facing in a direction opposite to the first direction.

In an embodiment of the present invention, the second lens further includes a flat surface facing in the first direction.

In an embodiment of the present invention, the third lens further includes a flat surface facing in a direction opposite to the first direction.

BRIEF DESCRIPTION OF THE DRAWINGS

The above and other features of the present invention will become more apparent by describing in further detail exemplary embodiments thereof with reference to the accompanying drawings, in which.

DETAILED DESCRIPTION OF THE EMBODIMENTS

Figure 1:
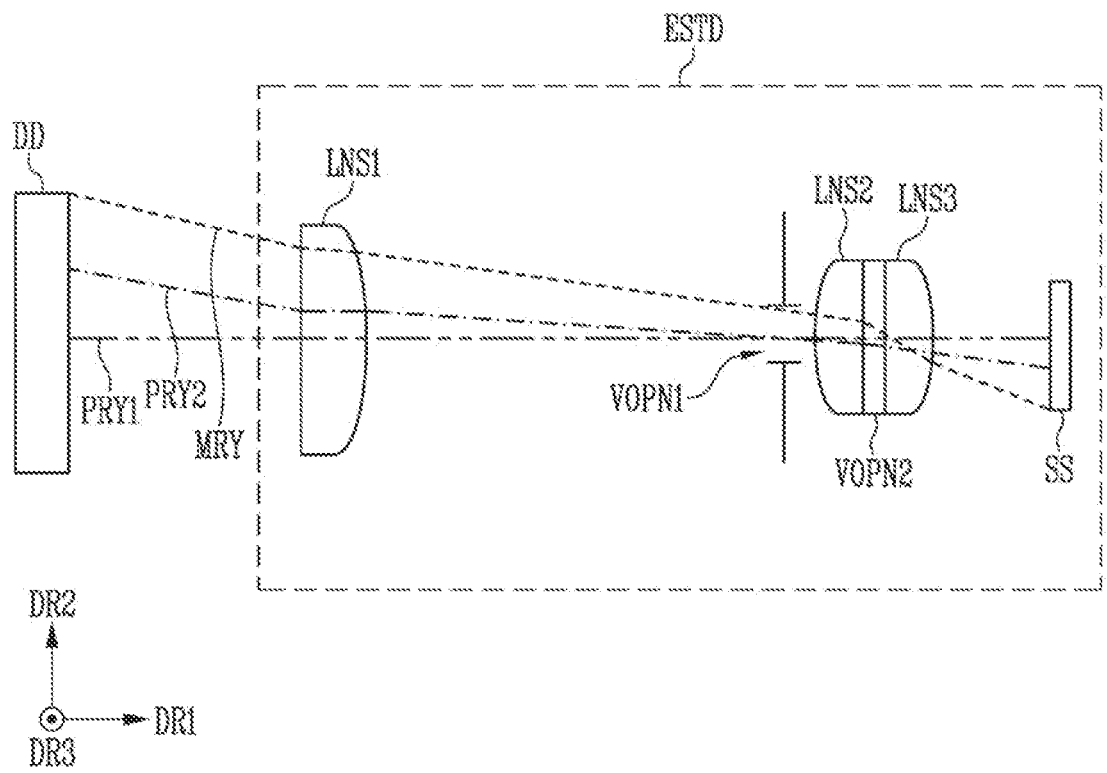
FIG. 1 is a diagram illustrating a light measuring device according to an embodiment of the present invention.

Hereinafter, various embodiments of the present invention will be described in detail with reference to the accompanying drawings. The present invention may be embodied in various different forms and is not limited to the embodiments described herein.

The same or similar components are denoted by the same reference numerals throughout the specification and the drawings, and a repeated description of the same components may be omitted or briefly discussed. Therefore, the reference numerals described above may also be used in other drawings.

In the drawings, various thicknesses, lengths, and angles are shown and while the arrangement shown does indeed represent an embodiment of the present invention, it is to be understood that modifications of the various thicknesses, lengths, and angles may be possible within the spirit and scope of the present invention and the present invention is not necessarily limited to the particular thicknesses, lengths, and angles shown.

In addition, in the description, the expression "the same" may mean "substantially the same". That is, it may be the same enough to convince those of ordinary skill in the art to be the same. In other expressions, "substantially" may be omitted.

FIG. 1 is a diagram illustrating a light measuring device according to an embodiment of the present invention.

Referring to FIG. 1, a display device DD and a light measuring device ESTD are shown as an example.

The display device DD may include a conventional display panel for displaying an image, such as a liquid crystal display panel or an organic light emitting display panel. It is assumed that the display panel has a plane extending in second and third directions DR2 and DR3. For example, the display panel may have a completely flat surface or a curved surface. The display device DD may be a near eye display device for realizing Augmented Reality (AR) or Virtual Reality (VR).

The display device DD may display an image in a first direction DR1. The first direction DR1, the second direction DR2, and the third direction DR3 may be substantially perpendicular to each other. Light PRY1 constituting the image may be emitted from the center of the display device DD. Another light MRY constituting the image may be emitted from the edge of the display device DD. Another light PRY2 constituting the image may be emitted at an arbitrary position between a position where the light PRY1 is emitted and a position where the light MRY is emitted in the display device DD.

The light measuring device ESTD may include a first lens LNS1, a first variable opening VOPN1, a second lens LNS2, a second variable opening VOPN2, a third lens LNS3, and a light receiving unit SS. The light measuring device ESTD may be positioned in the first direction DR1 at a predetermined distance from the display device DD. Centers of the display device DD, the first lens LNS1, the first variable opening VOPN1, the second lens LNS2, the second variable opening VOPN2, the third lens LNS3, and the light receiving unit SS may be aligned with each other in the first direction DR1.

The first lens LNS1 may include a convex surface protruding in the first direction DR1. For example, the convex surface of the first lens LNS1 may face the first variable opening VOPN1. The first lens LNS1 may further include a flat surface in a direction opposite to the first direction DR1. In an embodiment of the present invention, the first lens LNS1 may further include a convex surface in a direction opposite to the first direction DR1.

The first variable opening VOPN1 may be located in the first direction DR1 from the first lens NS1. For example, the light measuring device ESTD may further include a mechanical driving device such as a motor or an actuator. The first variable opening VOPN1 may be a mechanical aperture whose diameter is controlled by the motor and/or a controller. A diameter of the first variable opening VOPN1 may be defined on a plane in the second and third directions DR2 and DR3. For example, the size of the diameter of the first variable opening VOPN1 may be adjusted according to the size of a measurement area (for example, the size of an image displayed by the display device DD), a distance between the display device DD and the light measuring device ESTD, and the like.

The second lens LNS2 may be located in the first direction DR1 from the first variable opening VOPN1. The second lens LNS2 may include a convex surface facing in a direction opposite to the first direction DR1. For example, the convex surface of the second lens LNS2 may protrude in the direction opposite to the first direction DR1. The second lens LNS2 may further include a flat surface facing in the first direction DR1. In an embodiment of the present invention, the second lens LNS2 may further include a convex surface in the first direction DR1.

The second variable opening VOPN2 may be located in the first direction DR1 from the second lens LNS2. For example, a diameter of the second variable opening VOPN2 may be adjusted independently of the diameter of the first variable opening VOPN1. The diameter of the second variable opening VOPN2 may be defined on a plane in the second and third directions DR2 and DR3. For example, the second variable opening VOPN2 may function like a pupil of a human eye. For example, the diameter of the second variable opening VOPN2 may be adjusted within a range of about 0.5 mm to about 8 mm. In a relatively dark environment, the diameter of the second variable opening VOPN2 may be increased to increase the amount of light received. In addition, in a relatively bright environment, the diameter of the second variable opening VOPN2 may be reduced, and a diffraction effect caused by outside light may be reduced, thereby obtaining a clear image with reduced noise.

The third lens LNS3 may be located in the first direction DR1 from the second variable opening VOPN2. For example, the second variable opening VOPN2 may be positioned between the second lens LNS2 and the third lens LNS3. The third lens LNS3 may include a convex surface facing in the first direction DR1. For example, the convex surface of the third lens LNS3 may protrude in the first direction DR1. The third lens LNS3 may further include a flat surface facing in a direction opposite to the first direction DR1. In an embodiment of the present invention, the third lens LNS3 may further include a convex surface facing in a direction opposite to the first direction DR1.

According to an embodiment of the present invention, the second lens LNS2, the second variable opening VOPN2, and the third lens LNS3 may be configured as an integrated variable opening lenses. A distance between the first lens LNS1 and the second lens LNS2 may be larger than a distance between the second lens LNS2 and the third lens LNS3.

The light receiving unit SS may be located in the first direction DR1 from the third lens LNS3 by a predetermined distance. The light receiving unit SS may be an image sensor. For example, the light receiving unit SS may be a complementary metal oxide semiconductor (CMOS) sensor.

Figure 2:
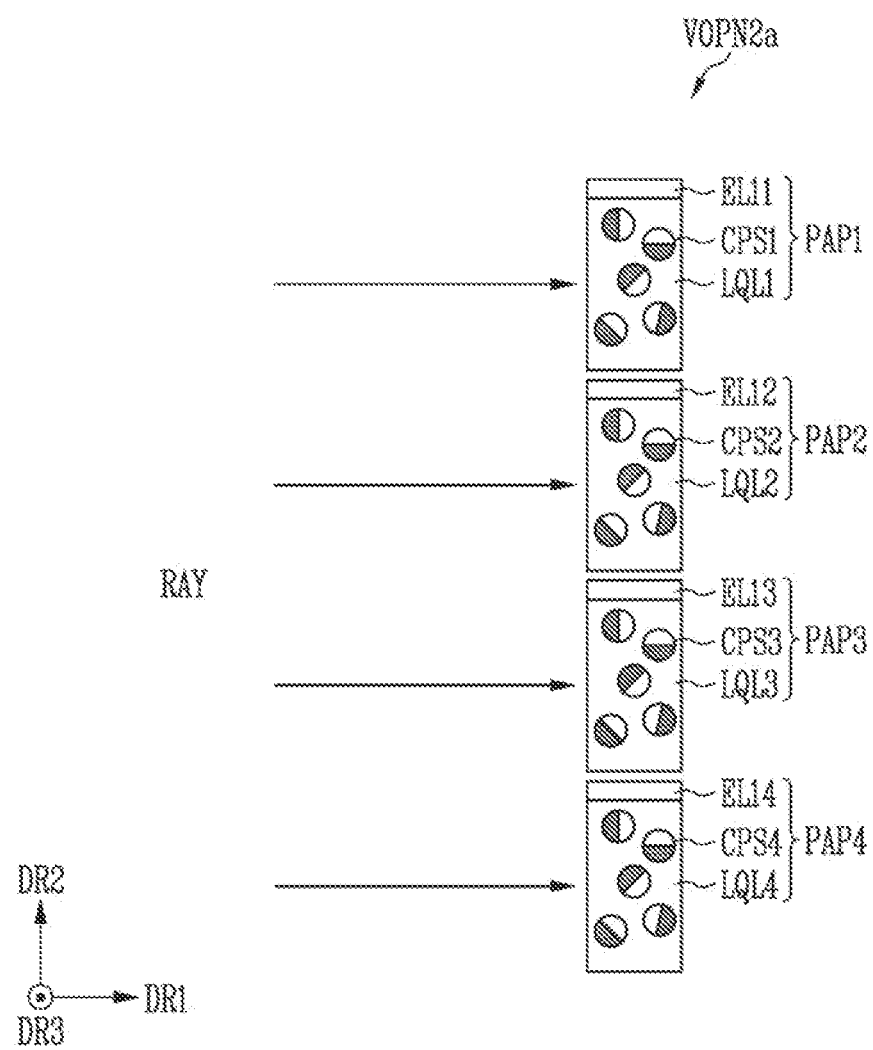
FIGS. 2 and 3 are diagrams illustrating a second variable opening according to an embodiment of the present invention.
Figure 3:
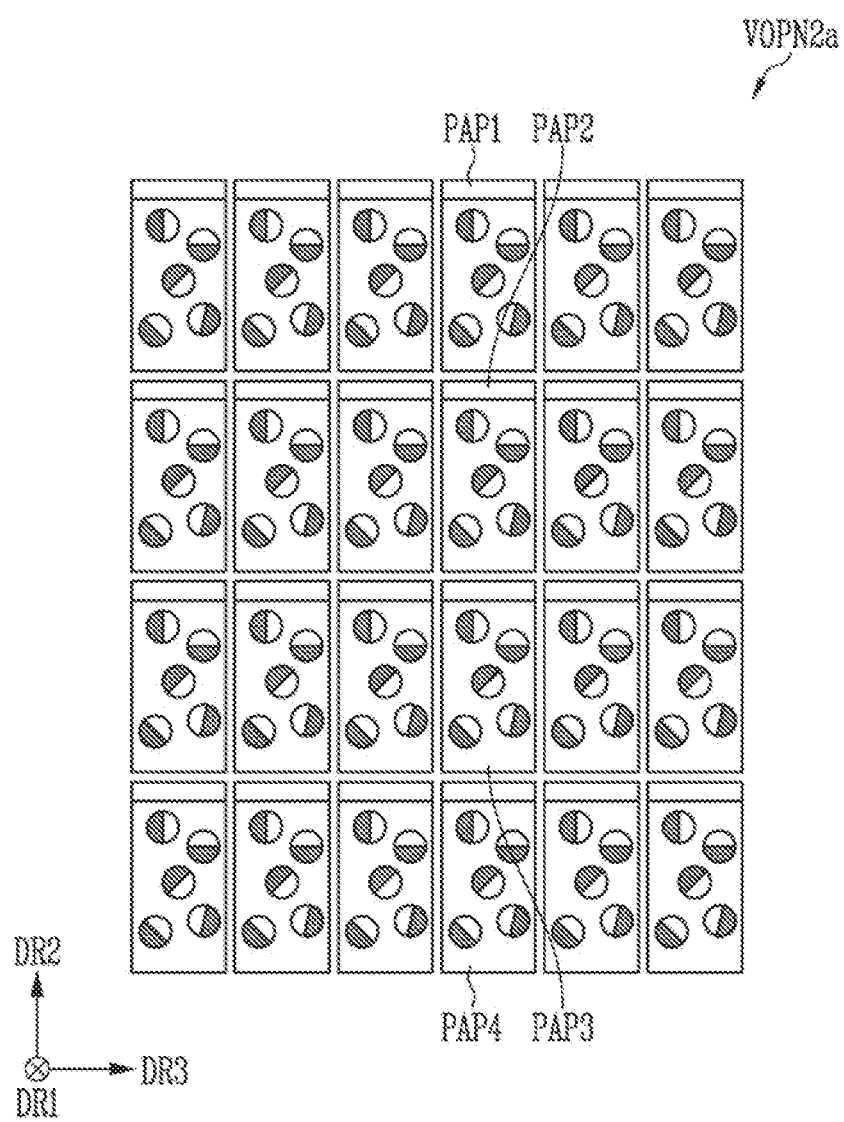
Figure 4:
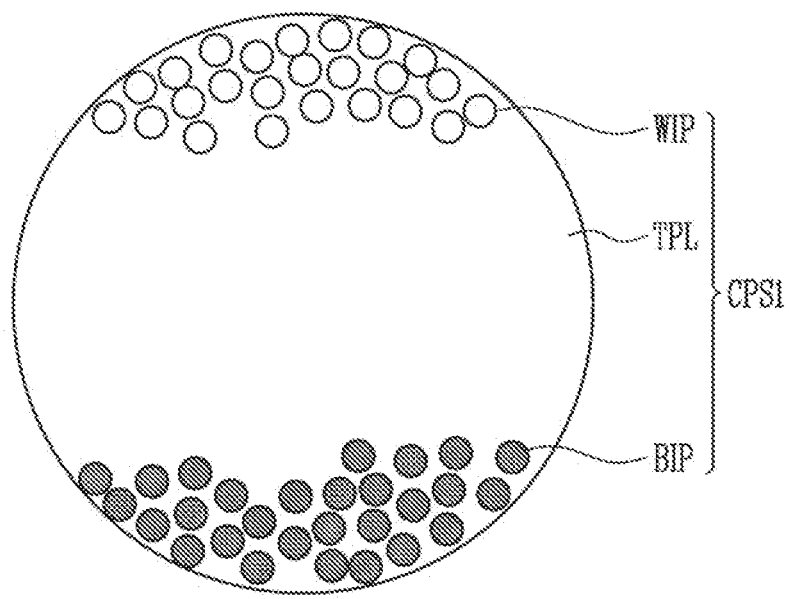
FIG. 4 is a diagram illustrating an electronic ink capsule.

FIGS. 2 and 3 are diagrams illustrating a second variable opening according to an embodiment of the present invention. FIG. 4 is a diagram illustrating an electronic ink capsule.

Referring to FIG. 2, a second variable opening VOPN2a according to an embodiment of the present invention may include a plurality of partial openings PAP1, PAP2, PAP3, and PAP4. The plurality of partial openings PAP1, PAP2, PAP3, and PAP4 may be arranged in the second direction DR2. Although only four partial openings PAP1, PAP2, PAP3, and PAP4 are shown here, the number of partial openings PAP1, PAP2, PAP3, and PAP4 included in the second variable opening VOPN2a may be more or less than four.

In addition, in other drawings including FIG. 2, only a side of the second variable opening VOPN2a is shown to show a light path in the first direction DR1. However, referring to FIG. 3, the plurality of partial openings PAP1, PAP2, PAP3, PAP4, . . . included in the second variable opening VOPN2a may be arranged on a plane in the second and third directions DR2 and DR3. For example, the plurality of partial openings PAP1, PAP2, PAP3, PAP4, . . . may be arranged in a matrix form on a plane in the second and third directions DR2 and DR3.

Each of the partial openings PAP1, PAP2, PAP3, and PAP4 may include a transparent layer LQL1, LQL2, LQL3, or LQL4, a plurality of electronic ink capsules CPS1, CPS2, CPS3, or CPS4, and a first electrode EL11, EL12, EL13, or EL14.

The transparent layer LQL1, LQL2, LQL3, or LQL4 may be formed of a transparent gas, liquid, or solid. For example, the transparent layer LQL1, LQL2, LQL3, and LQL4 may be a liquid polymer layer.

The plurality of electronic ink capsules CPS1, CPS2, CPS3, and CPS4 may be positioned inside the transparent layers LQL1, LQL2, LQL3, and LQL4, respectively. In addition, even though four electronic ink capsules CPS1, CPS2, CPS3, or CPS4 are illustrated in each of the transparent layers LQL1, LQL2, LQL3, or LQL4, the present invention is not limited thereto. For example, the number of electronic ink capsules CPS1, CPS2, CPS3, or CPS4 may be less than or greater than four. In addition, even though four transparent layers LQL1, LQL2, LQL3, and LQL4 are illustrated, the present invention is not limited thereto. For example, the number of transparent layers LQL1, LQL2, LQL3, and LQL4 may be less than or greater than four.

The first electrodes EL11, EL12, EL13, and EL14 may be disposed on the transparent layers LQL1, LQL2, LQL3, and LQL4, respectively. For example, the first electrode EL11, EL12, EL13, or EL14 may be arranged in the second direction DR2 with the transparent layer LQL1, LQL2, LQL3, or LQL4. For example, the first electrode EL11, EL12, EL13, or EL14 may be disposed on an upper surface of the transparent layer LQL1, LQL2, LQL3, or LQL4. In an embodiment of the present invention, the first electrode EL11, EL12, EL13, or EL14 may be arranged in a direction, which is opposite to the second direction DR2, with the transparent layer LQL1, LQL2, LQL3, or LQL4. The first electrode EL11, EL12, EL13, or EL14 may include a transparent conductive material. For example, the first electrode EL11, EL12, EL13, or EL14 may include at least one of silver nanowires (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nanotubes, and/or graphene.

Referring to FIG. 4, an example of the electronic ink capsule CPS1 is shown. The electronic ink capsule CPS1 may include a transparent liquid TPL, first ink particles BIP, and second ink particles WIP.

The transparent liquid TPL may provide fluidity of positions of the first ink particles BIP and the second ink particles WIP. For example, the first ink particles BIP and the second ink particles WIP may flow throughout the transparent liquid TPL.

The first ink particles BIP may be negatively charged particles. The first ink particles BIP may be black particles. In another example, the first ink particles BIP may be positively charged particles.

The second ink particles WIP may be positively charged particles. The second ink particles WIP may be white particles. In another example, the second ink particles WIP may be negatively charged particles.

In an embodiment of the present invention, the electronic ink capsule CPS1 might not include the second ink particles WIP, but may include only the transparent liquid TPL and the first ink particles BIP.

When no voltage is applied to the first electrode EL11, EL12, EL13, or EL14, the first ink particles BIP and the second ink particles WIP may be randomly distributed throughout the corresponding electronic ink capsule CPS1, CPS2, CPS3, or CPS4. Accordingly, as shown in FIG. 2, the second variable opening VOPN2a may block all light RAY. In this case, a diameter of the second variable opening VOPN2a may be 0.

Figure 5:
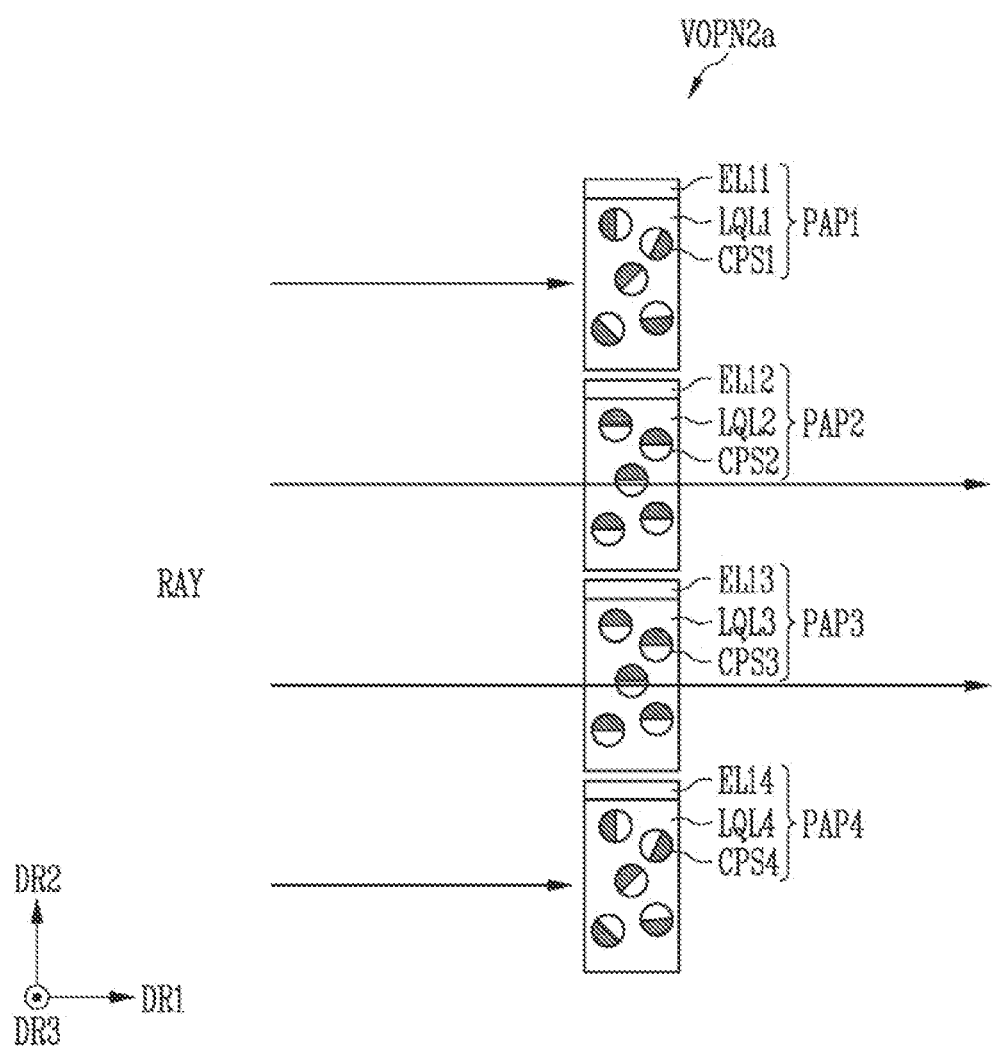
FIGS. 5 and 6 are diagrams illustrating a process of adjusting a diameter of the second variable opening.
Figure 6:
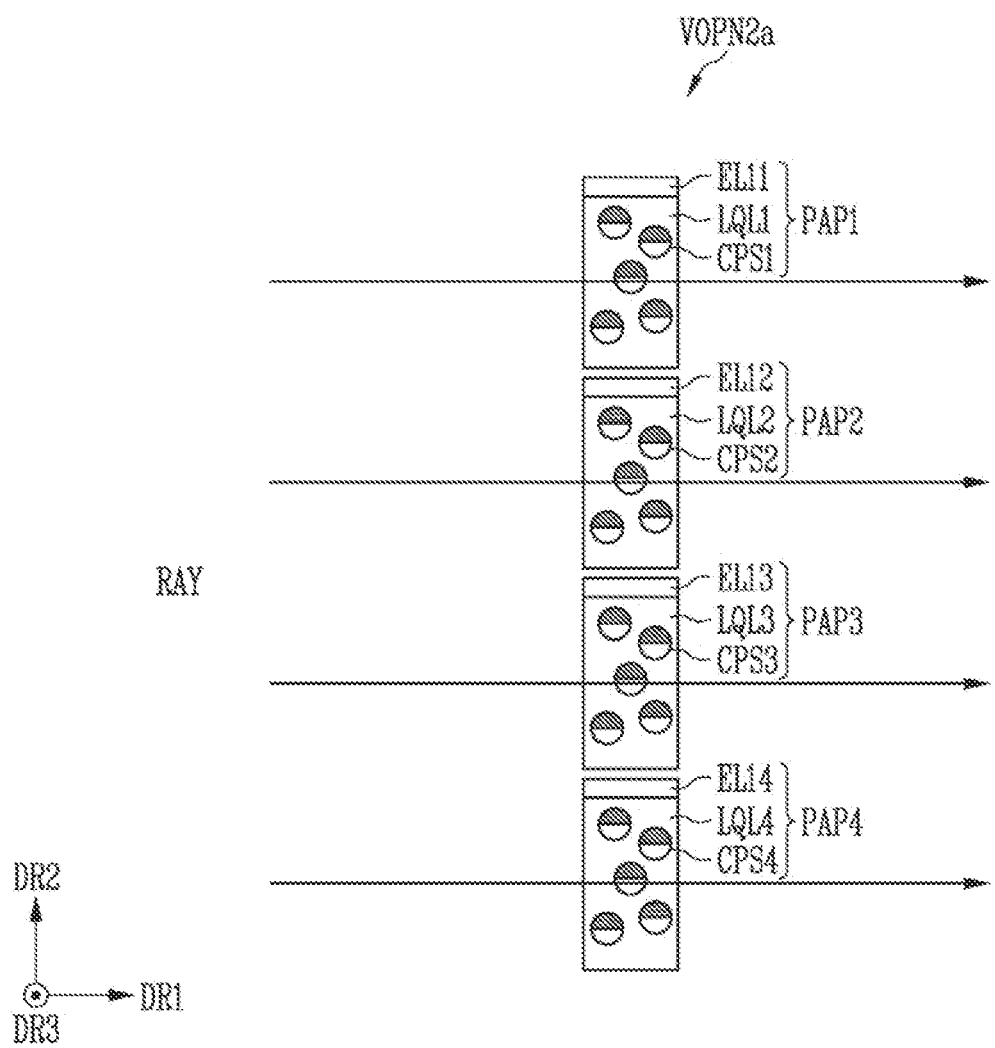

FIGS. 5 and 6 are diagrams for explaining a process of adjusting a diameter of the second variable opening.

As described above, when no voltage is applied to the first electrode EL11, EL12, EL13, or EL14, each of the plurality of partial openings PAP1, PAP2, PAP3, and PAP4 may be in a blocked state. For example, in a blocked state, light RAY might not travel through at least some of the transparent liquid TPL and the transparent layer LQL1, LQL2, LQL3, and LQL4 of the electronic ink capsules CPS1, CPS2, CPS3, and CPS4.

In addition, when a voltage is applied to the first electrode EL11, EL12, EL13, or EL14, each of the plurality of partial openings PAP1, PAP2, PAP3, and PAP4 may be in an open state. For example, when a positive voltage is applied to the first electrode EL11, EL12, EL13, or EL14, the first ink particles BIP may be aligned in a direction close to or a direction toward the first electrode EL11, EL12, EL13, or EL14, and the second ink particles WIP may be aligned in a direction away from the first electrode EL11, EL12, EL13, or EL14. Accordingly, the light RAY may pass through the transparent liquid TPL and the transparent layer LQL1, LQL2, LQL3, or LQL4 of the electronic ink capsules CPS1, CPS2, CPS3, and CPS4.

In addition, when a negative voltage is applied to the first electrode EL11, EL12, EL13, or EL14, the second ink particles WIP may be aligned in a direction close to or a direction toward the first electrode EL11, EL12, EL13, or EL14, and the first ink particles BIP may be aligned in a direction away from the first electrode EL11, EL12, EL13, or EL14. Accordingly, the light RAY may pass through the transparent liquid TPL and the transparent layer LQL1, LQL2, LQL3, or LQL4 of the electronic ink capsules CPS1, CPS2, CPS3, and CPS4.

Referring to FIG. 5, a case where the second variable opening VOPN2a has a first diameter is shown. In this case, among the plurality of partial openings PAP1, PAP2, PAP3, and PAP4, n partial openings PAP2 and PAP3 may be in an open state, where n may be an integer greater than 0. In the case of FIG. 5, n may be 2.

Referring to FIG. 6, a case where the second variable opening VOPN2a has a second diameter is shown. In this case, among the plurality of partial openings PAP1, PAP2, PAP3, and PAP4, m partial openings PAP1, PAP2, PAP3, and PAP4 may be in an open state, where m may be an integer greater than 0. In the case of FIG. 6, m may be 4. When the second diameter is greater than the first diameter, m may be greater than n.

Figure 7:
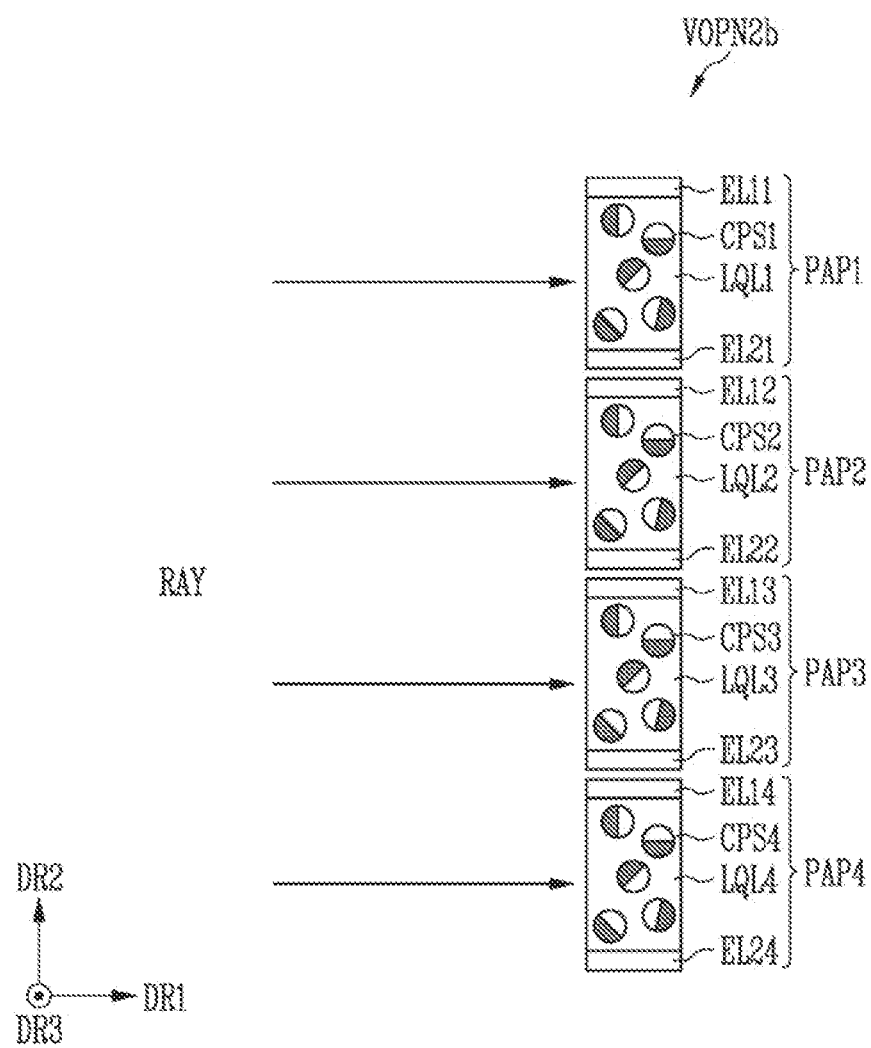
FIGS. 7, 8 and 9 are diagrams illustrating a second variable opening according to an embodiment of the present invention.
Figure 8:
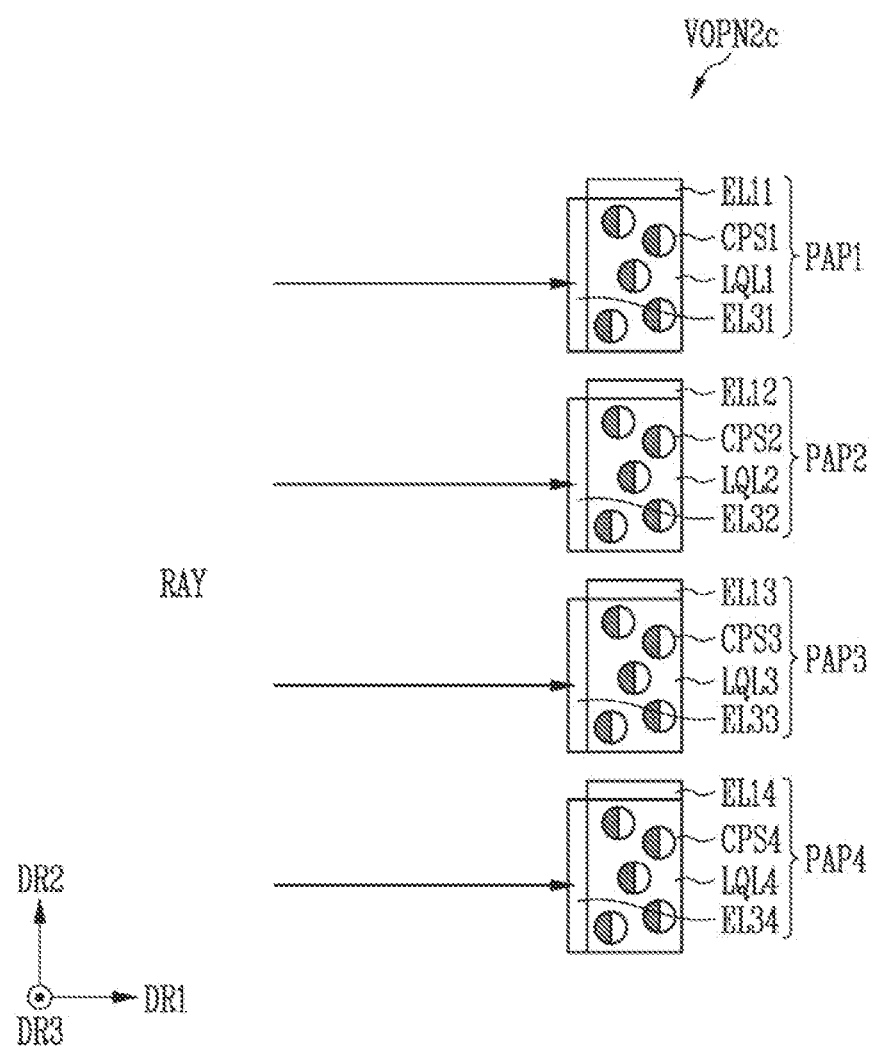
Figure 9:
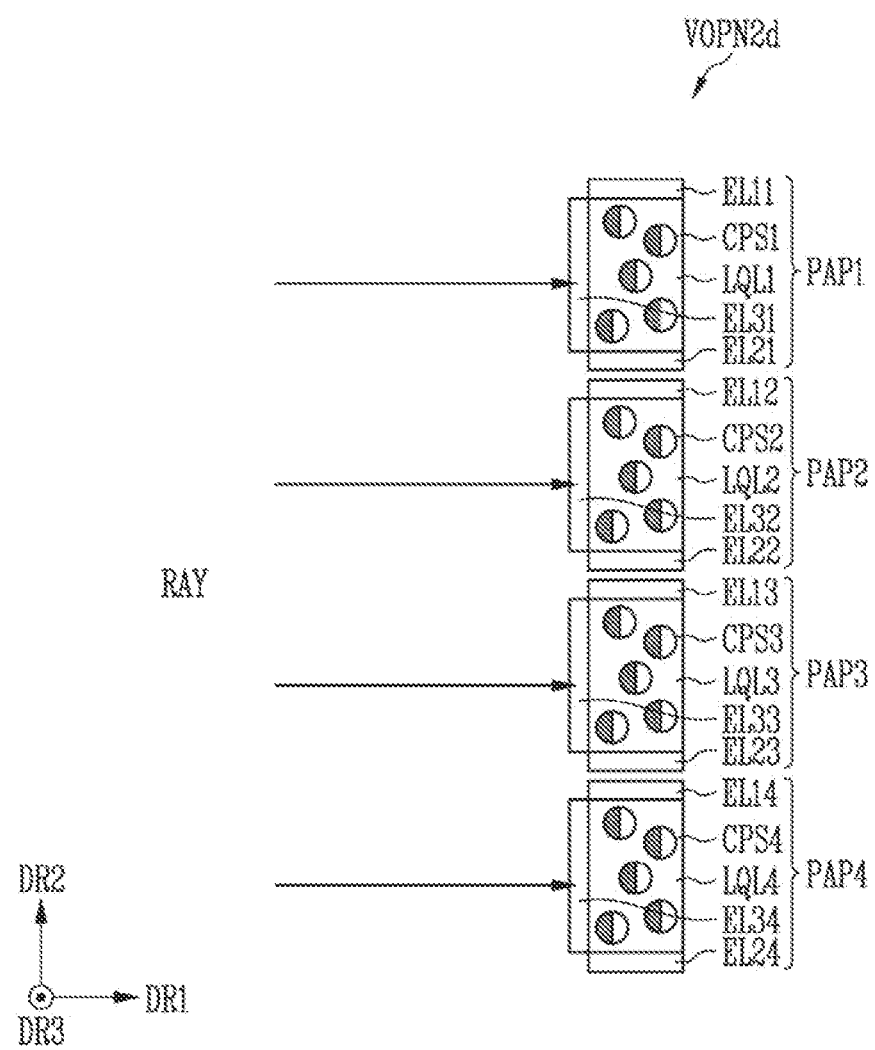

FIGS. 7 to 9 are diagrams illustrating a second variable opening according to an embodiment of the present invention.

Referring to FIG. 7, each of the plurality of partial openings PAP1, PAP2, PAP3, and PAP4 of the second variable opening VOPN2b may further include a second electrode EL21, EL22, EL23, or EL24 that is insulated from the first electrode EL11, EL12, EL13, or EL14. The second electrode EL21, EL22, EL23, or EL24 may be located in a direction opposite to the second direction DR2 from the transparent layer LQL1, LQL2, LQL3, or LQL4. For example, the second electrode EL21, EL22, EL23, and EL24 may be positioned on a side of the transparent layer LQL1, LQL2, LQL3, and LQL4 that is opposite to the side on which the first electrode EL11, EL12, EL13, and EL14 is disposed. For example, the second electrode EL21, EL22, EL23, and EL24 may be disposed on a lower surface of the transparent layer LQL1, LQL2, LQL3, and LQL4.

The second electrode EL21, EL22, EL23, or EL24 may include a transparent conductive material. For example, the second electrode EL21, EL22, EL23, or EL24 may include at least one of silver nanowires (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nanotubes, and graphene.

According to the present embodiment, to set each of the plurality of partial openings PAP1, PAP2, PAP3, and PAP4 to an open state, voltages that have different polarities from each other may be applied to the first electrode EL11, EL12, EL13, or EL14 and the second electrode EL21, EL22, EL23, or EL24. For example, when a positive voltage is applied to the first electrode EL11, EL12, EL13, or EL14 and a negative voltage is applied to the second electrode EL21, EL22, EL23, or EL24, the first ink particles BIP may be aligned by moving in the second direction DR2, and the second ink particles WIP may be aligned by moving in a direction opposite to the second direction DR2.

Referring to FIG. 8, each of the plurality of partial openings PAP1, PAP2, PAP3, and PAP4 of the second variable opening VOPN2c may further include a third electrode EL31, EL32, EL33, or EL34. The third electrode EL31, EL32, EL33, or EL34 may be located in a direction opposite to the first direction DR1 from the transparent layer LQL1, LQL2, LQL3, or LQL4. For example, the third electrode EL31, EL32, EL33, or EL34 may be disposed on a side surface of the transparent layer LQL1, LQL2, LQL3, and LQL4 that extends in second direction DR2 and may be disposed adjacent to the first electrode EL11, EL12, EL13, and EL14. In an embodiment of the present invention, the third electrode EL31, EL32, EL33, or EL34 may be located in the first direction DR1 from the transparent layer LQL1, LQL2, LQL3, or LQL4.

The third electrode EL31, EL32, EL33, or EL34 may include a transparent conductive material. For example, the third electrode EL31, EL32, EL33, or EL34 may include at least one of silver nanowires (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nanotubes, and/or graphene.

According to the present embodiment, to set each of the plurality of partial openings PAP1, PAP2, PAP3, and PAP4 to a blocked state, a voltage may be applied to the third electrode EL31, EL32, EL33, and EL34. For example, when a positive voltage is applied to the third electrode EL31, EL32, EL33, or EL34, the first ink particles BIP may be aligned by moving in a direction opposite to the first direction DR1, and the second ink particles WIP may be aligned by moving in the first direction DR1. In addition, when a negative voltage is applied to the third electrode EL31, EL32, EL33, or EL34, the first ink particles BIP may be aligned by moving in the first direction DR1, and the second ink particles WIP may be aligned by moving in a direction opposite to the first direction DR1.

The light shielding effect may be increased in the case of FIG. 8 than in the case where the plurality of partial openings PAP1, PAP2, PAP3, and PAP4 do not include the third electrode EL31, EL32, EL33, or EL34.

The second variable opening VOPN2d of FIG. 9 illustrates an embodiment of the present invention in which each of the plurality of partial openings PAP1, PAP2, PAP3, and PAP4 includes both the second electrode EL21, EL22, EL23, or EL24 and the third electrode EL31, EL32, EL33, or EL34.

The second variable opening VOPN2d may perform all of the functions described in FIGS. 7 and 8. Duplicate descriptions thereof may be omitted or briefly discussed.

The present invention may provide a light measuring device suitable for evaluating light characteristics of a near eye display device.

While the present invention has been particularly shown and described with reference to embodiments thereof, it will be apparent those of ordinary skill in the art that various changes in form and detail may be made thereto without departing from spirit and scope of the present invention.

What is claimed is:

1. A light measuring device comprising:
a first lens;
a first variable opening located in a first direction from the first lens at a predetermined distance;
a second lens located in the first direction from the first variable opening at a predetermined distance;
a second variable opening located in the first direction from the second lens;
a third lens located in the first direction from the second variable opening; and
a light receiving unit located in the first direction from the third lens at a predetermined distance,
wherein a diameter of the first variable opening and a diameter of the second variable opening are independently adjusted.

2. The light measuring device of claim 1, wherein the first lens includes a convex surface protruding in the first direction.

3. The light measuring device of claim 2, wherein the second lens includes a convex surface protruding in a direction opposite to the first direction.

4. The light measuring device of claim 3, wherein the third lens includes a convex surface protruding in the first direction.

5. The light measuring device of claim 1, wherein the second variable opening includes a plurality of partial openings arranged in a second direction that is different from the first direction.

6. The light measuring device of claim 5, wherein n partial openings among the plurality of partial openings are in an open state when the second variable opening has a first diameter, and m partial openings among the plurality of partial openings are in an open state when the second variable opening has a second diameter, wherein n and m are integers greater than 0, and wherein m is greater than n when the second diameter is greater than the first diameter.

7. The light measuring device of claim 5, wherein each of the plurality of partial openings includes:
a transparent layer;
a plurality of electronic ink capsules positioned inside the transparent layer; and
a first electrode.

8. The light measuring device of claim 7, wherein in each of the plurality of partial openings, the first electrode is located on an upper surface of the transparent layer.

9. The light measuring device of claim 8, wherein each of the plurality of partial openings further includes:
a second electrode that is insulated from the first electrode.

10. The light measuring device of claim 9, wherein the second electrode is located on a side surface of the transparent layer.

11. The light measuring device of claim 9, wherein the second electrode is located on a lower surface of the transparent layer.

12. The light measuring device of claim 11, wherein each of the plurality of partial openings further includes:
a third electrode located on a side surface of the transparent layer.

13. The light measuring device of claim 7, wherein each of the plurality of partial openings is in an open state when a voltage is applied to the first electrode.

14. The light measuring device of claim 13, wherein each of the plurality of partial openings is in a blocked state when the voltage is not applied to the first electrode.

15. The light measuring device of claim 10, wherein each of the plurality of partial openings is in an open state when a voltage is applied to the first electrode.

16. The light measuring device of claim 15, wherein each of the plurality of partial openings is in a blocked state when a voltage is applied to the second electrode.

17. The light measuring device of claim 1, wherein a distance between the first lens and the second lens is larger than a distance between the second lens and the third lens.

18. The light measuring device of claim 2, wherein the first lens further includes a flat surface facing in a direction opposite to the first direction.

19. The light measuring device of claim 3, wherein the second lens further includes a flat surface facing in the first direction.

20. The light measuring device of claim 4, wherein the third lens further includes a flat surface facing in a direction opposite to the first direction.

* * * * *